United States Patent
Van Rooy

(10) Patent No.: US 6,366,324 B1
(45) Date of Patent: Apr. 2, 2002

(54) TRANSMITTING SEQUENTIALLY SCANNED IMAGES THROUGH A CHANNEL INTENDED FOR INTERLACED IMAGES

(75) Inventor: Johannes H. J. M. Van Rooy, Breda (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/347,217

(22) Filed: Jul. 2, 1999

(30) Foreign Application Priority Data

Jul. 8, 1998 (EP) .............................. 98202290

(51) Int. Cl.⁷ ................................. H04N 7/12
(52) U.S. Cl. .................. 348/429.1; 348/432.1
(58) Field of Search ................... 348/446, 429, 348/443, 434, 432, 474

(56) References Cited

U.S. PATENT DOCUMENTS 5,216,505 A    6/1993  Kageyama et al. ......... 358/141
5,268,751 A *  12/1993  Geiger et al. ............... 358/12
5,438,368 A *  8/1995   Hütter ........................ 348/434
5,610,661 A *  3/1997   Bhatt ......................... 348/446
5,963,261 A *  10/1999  Dean .......................... 348/446

FOREIGN PATENT DOCUMENTS

| JP | 514930 | 1/1993 | ............ H04N/11/20 |
| WO | WO9304560 | 3/1993 | ............ H04N/7/00 |
| WO | WO9404000 | 2/1994 | ............ H04N/7/01 |

* cited by examiner

*Primary Examiner*—Victor R. Kostak
(74) *Attorney, Agent, or Firm*—Steven R. Biren

(57) ABSTRACT

In a method for encoding a non-interlaced signal (60P) into an interlaced signal (60I) and an auxiliary signal, the interlaced signal (60I) is generated in dependence on the non-interlaced signal (60P), and the auxiliary signal is generated by furnishing regeneration coefficients enabling a reconstruction of non-encoded lines (o: D) of the non-interlaced signal (60P) in dependence on the interlaced signal (60I: A, B, C) and the regeneration coefficients. The invention is preferably applied in a method of processing non-interlaced signals by equipment, such as studio equipment, developed for processing interlaced signals.

9 Claims, 1 Drawing Sheet

TRANSMITTING SEQUENTIALLY SCANNED IMAGES THROUGH A CHANNEL INTENDED FOR INTERLACED IMAGES

BACKGROUND OF THE INVENTION

1. Field of the Invention

The invention relates to a method and system for transmitting sequentially scanned images thru a channel intended for interlaced images.

2. Description of the Related Art

U.S. Pat. No. 5,216,505 discloses a scanning line interpolation circuit for reproducing scanning lines not transmitted through interpolation on the basis of a main scanning line signal and an auxiliary signal both transmitted, wherein an interpolated scanning line signal is generated on the basis of the main scanning line signal and auxiliary signal with respect to a frequency band used to transmit the auxiliary signal, and an interpolated scanning line is generated in response to picture motion on the basis of only the main scanning line signal with respect to a frequency band used not to transmit the auxiliary signal.

In the USA recently, a set of standards for digital television has been adopted. This set of standards includes interlaced and progressive scanned pictured at frame rates of 24 to 60 fields per second. Present day broadcasting systems employ interlaced signals according to the NTSC standard, and the studio equipment, like cameras, switches, digital effect units, often is capable for processing just that standard.

The standard digital interface in a studio is the 270 Mbit/sec serial digital interface (SDI), laid out for 10-bit 4:2:2 sampled signals according to ITU-R.BT601.

SUMMARY OF THE INVENTION

It is, inter alia, an object of the invention to provide a simpler system which is able to recreate non-transmitted lines from transmitted lines and an auxiliary signal without requiring a motion detection or frequency band dependent circuitry. To this end, a first aspect of the invention provides a method of and a device for encoding a non-interlaced signal. A second aspect of the invention provides a method of processing non-interlaced signals by means of equipment, such as studio equipment, developed for processing interlaced signals. A third aspect of the invention provides a method of and a device for decoding a non-interlaced signal from an interlaced signal and an auxiliary signal. A fourth aspect of the invention provides an encoded non-interlaced signal having the shape of an interlaced signal.

A primary aspect of the invention provides a method for encoding a non-interlaced signal into an interlaced signal and an auxiliary signal, in which the interlaced signal is generated in dependence on the non-interlaced signal, and the auxiliary signal is generated by furnishing regeneration coefficients enabling a reconstruction of non-encoded lines of the non-interlaced signal in dependence on the interlaced signal and the regeneration coefficients. The invention is preferably applied in a method of processing non-interlaced signals by means of equipment, such as studio equipment, developed for processing interlaced signals.

These and other aspects of the invention will be apparent from and elucidated with reference to the embodiments described hereinafter.

DESCRIPTION OF THE PREFERRED EMBODIMENTS

Suppose the CCD in the camera scans at 480 lines/frame, at 60 frames/second (60P). This signal will have a line period of approximately 32 microseconds. To convert this signal to a 60 Hz interlaced signal (60I), one method is to simple skip all even lines from the odd frames, and to skip the odd lines from the even frames (line drop mode, FIG. 1). In the left-hand part of FIG. 1, an 'o' indicates a line which is to be dropped, while an 'x' indicates a line which stays. V indicates vertical position, while t indicates time.

Figure 2:
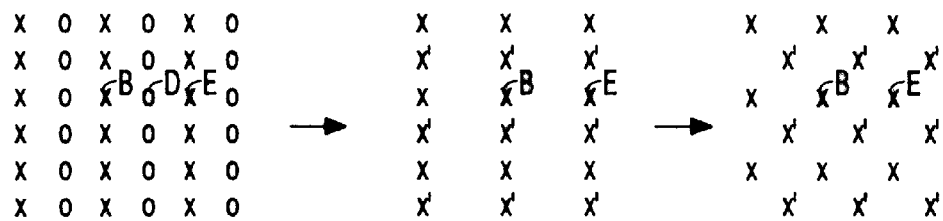
FIG. 2 illustrates an alternative way of deriving interlaced signals from non-interlaced signals.

Another method is making a semi-interlaced signal at 30 frames/second by dropping every second frame of the 60P signal, and multiplexing the remaining frame (30I) into an odd and even field, together forming a 60 Hz interlaced signal 60I (frame drop mode, FIG. 2). The line period of the remaining lines then can be doubled to the approximately 64 μs corresponding to the 525 lines NTSC standard.

The resulting interlaced signal 60I can be processed in the normal way in the digital video processing of the camera, transported to the studio and edited in a normal way, including switching between signals, wipes, fades. Skipping lines as previously described is a known way to convert progressive scanned pictures to interlace.

The invention relates to the way the pixels in the discarded lines are handled: the pixels in the lines (o) that are to be thrown away will be characterized with a parameter K describing the pixel as a weighed average of sets of surrounding pixels in the spatio-temporal domain. More specifically, in the case of the line drop mode (FIG. 1), this can be the weighed average of the pixel (B) on the corresponding x, y coordinate in the preceding frame and the intra-frame average of the pixels directly above (A) and under (C), the pixel (D) to be dropped. For the frame drop mode (FIG. 2), K can, for instance, be determined out of the pixels (B, E) with the same x, y coordinate in the preceding and next frame.

Characterizing the discarded pixel D as a weighed average of (sets of) pixels that are not discarded has the advantage that that this characterization can survive several types of video processing in the interlaced signal, without the need to process K. Hard switching and gain changes, like fades to black or white, and color correction will not cause errors. Even after non-linear camera video processing (knee, gamma) or a matrix operation, the discarded lines of the picture still can be recovered with a reasonable accuracy, as reconstruction basically is a linear interpolation (sometimes extrapolation) between processed pixels.

In the camera, the helper signal K can be on a parallel branch with the (interlaced) video processing.

After reconstructing the discarded pixels using K and the processed pixels, the camera can have 60 frames/second progressive signal (60P) at the output, even with a 60 fields/second interlace processing.

Depending on the system, reconstruction to a 60P signal also can take place in a later stage in the processing chain. The parameter K can, for instance, be inserted in the SDI transport stream either as auxiliary data, or in the least significant bits (LSBs) of the camera signal, bearing in mind that a typical camera signal after gamma correction has a signal-to noise ratio of approximately 50 dB, and 8 bits is sufficient for 58 dB quantizing S/N, while the interface has 10 bit-available.

This means that there are 2 LSBs available in the 10-bit Y stream and at least 2 bits in the Cr/Cb stream, so K can be 4 bits. Coding K in that way means that the information to reconstruct the discarded pixels is immediately present at the x, y, t position where reconstruction has to be done.

The video signal+K signal in the LSBs thus can survive wipes in post-processing, or channel logo insertion if this is done in 8-bit resolution.

The K-signal can also be inserted in the auxiliary data channel. As K is merely a weighing factor between pixels, the signal thus can survive gain changes in the 10-bit signals, like a fade to black or white.

Figure 1:
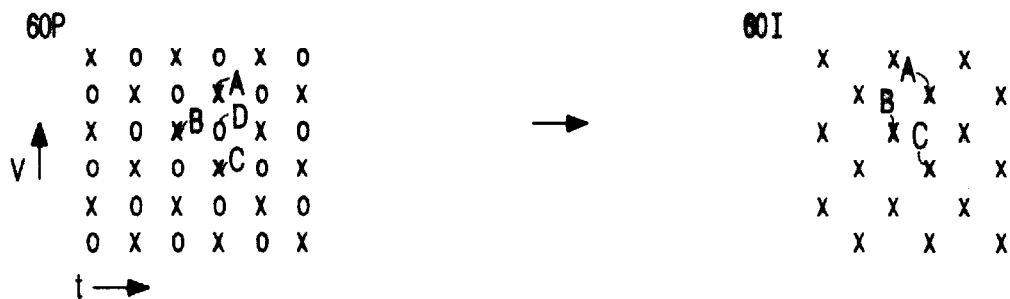
FIG. 1 shows a first way of deriving interlaced signals from non-interlaced signals.
Figure 3:
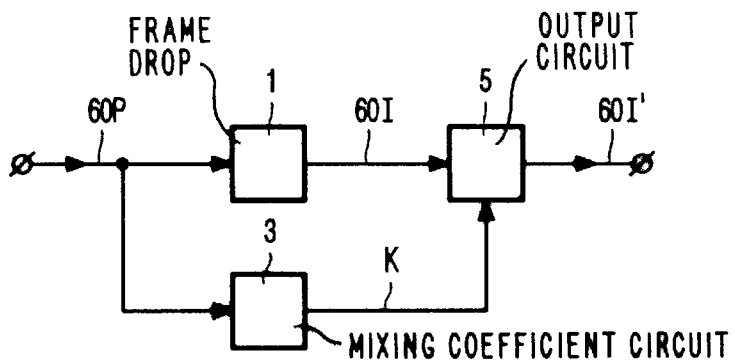
FIG. 3 shows an embodiment of an encoder in accordance with the present invention.
Figure 4:
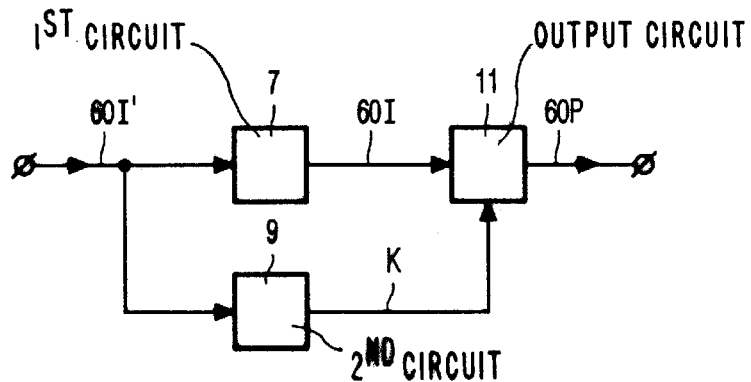
FIG. 4 shows an embodiment of a decoder in accordance with the present invention.

In the encoder of FIG. 3, a non-interlaced signal 60P is applied to a line or frame drop arrangement 1 for dropping non-encoded lines in accordance with, for example, the methods illustrated in FIG. 1 or FIG. 2. The non-interlaced signal 60P is also applied to a mixing coefficient circuit 3 for calculating the mixing coefficients K required to regenerate the non-encoded line D from the encoded lines A, B, C indicated in FIG. 1. As set out above, in a corresponding decoder such as shown in FIG. 4, line D will be approximated by mixing the signal from line B with the average of the signals from lines A and C, in accordance with the mixing coefficients K calculated by the mixing coefficient circuit 3. The output circuit 5 hides the mixing coefficients K from the circuit 3 into the interlaced signals 60I from the circuit 1 in such a manner that equipment developed for processing interlaced signals is not disturbed by the presence of the mixing coefficients K in the output interlaced signals 60I'.

In the decoder of FIG. 4, the "interlaced"-looking signal 60I' from the encoder of FIG. 3 is received by a first circuit 7 which retrieves the proper interlaced signals 60I therefrom. A second circuit 9 retrieves the mixing coefficients K which were hidden in the decoder's input signal 60I'. The output circuit 11 regenerates the non-encoded lines by means of the interlaced lines 60I from the first circuit 7 and the mixing coefficients K from the second circuit 9, and combines these regenerated lines with the interlaced lines 60I so as to form a non-interlaced output signal 60P.

A primary aspect of the invention can be summarized as follows. Characterizing pixels D in an image as a weighed average of sets (B and A, C; B and E) of surrounding pixels (in x, y, t), with weighing factor K describing the relative weight of each set, discarding these pixels D in signal processing, and reconstructing these pixels using the processed sets of surrounding pixels A, B, C; B, E and the (unprocessed) factor K. This aspect of the invention offers the following advantages: signal processing in the camera can be done with standard interlace processing, and with some restrictions in post-production, the signal can be edited and recorded in a non-compressed digital format (D1, D5).

It should be noted that the above-mentioned embodiments illustrate rather than limit the invention, and that those skilled in the art will be able to design many alternative embodiments without departing from the scope of the appended claims. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware. Obviously, the invention can be used with other frame rates and line numbers than those mentioned in the above examples.

What is claimed is:

1. A method of encoding a non-interlaced signal into an interlaced signal and an auxiliary signal, the method comprising the steps:

generating the interlaced signal in dependence on the non-interlaced signal; and generating the auxiliary signal by furnishing regeneration coefficients enabling a reconstruction of non-encoded lines of said non-interlaced signal in dependence on said interlaced signal and said regeneration coefficients, wherein said regeneration coefficients are mixing coefficients corresponding to non-discarded pixels enabling a reconstruction of said non-encoded lines by performing a weighted average of first and second signals generated from said interlaced signal in dependence on said mixing coefficients.

2. A method as claimed in claim 1, wherein said first signal is formed by a line temporally preceding a non-encoded line.

3. A method as claimed in claim 1, wherein said second signal is formed by vertically filtering lines of said interlaced signal around a non-encoded line.

4. A method as claimed in claim 1, wherein said auxiliary signal is hidden in least significant bits of said interlaced signal.

5. A device for encoding a non-interlaced signal into an interlaced signal (60I) and an auxiliary signal, the device comprising:

means for generating the interlaced signal in dependence on the non-interlaced signal; and means for generating the auxiliary signal by furnishing regeneration coefficients enabling a reconstruction of non-encoded lines of said non-interlaced signal in dependence on said interlaced signal and said regeneration coefficients, wherein said regeneration coefficients are mixing coefficients corresponding to non-discarded pixels enabling a reconstruction of said non-encoded lines by performing a weighted average of first and second signals generated from said interlaced signal in dependence on said mixing coefficients.

6. A method of processing non-interlaced signals by means of equipment, such as studio equipment, developed for processing interlaced signals, the method comprising:

generating the interlaced signals in dependence on the non-interlaced signals; and generating the auxiliary signal by furnishing regeneration coefficients enabling a reconstruction of non-encoded lines of said non-interlaced signals in dependence on said interlaced signals and said regeneration coefficients, wherein said regeneration coefficients are mixing coefficients corresponding to non-discarded pixels enabling a reconstruction of said non-encoded lines by performing a weighted average of first and second signals generated from said interlaced signal in dependence on said mixing coefficients.

7. A method of decoding a non-interlaced signal from an interlaced signal and an auxiliary signal, the method comprising:

receiving the interlaced signal;

receiving the auxiliary signal being formed by regeneration coefficients enabling a reconstruction of non-encoded lines of said non-interlaced signal in dependence on said interlaced signal and said regeneration coefficients; and reconstructing said non-encoded lines of said non-interlaced signal in dependence on said interlaced signal and said regeneration coefficients, wherein said regeneration coefficients are mixing coefficients corresponding to non-discarded pixels enabling a reconstruction of said non-encoded lines by performing a weighted average of first and second signals generated from said interlaced signal in dependence on said mixing coefficients.

8. A device for decoding a non-interlaced signal from an interlaced signal and an auxiliary signal, the device comprising:

means for receiving the interlaced signal;

means for receiving the auxiliary signal being formed by regeneration coefficients enabling a reconstruction of non-encoded lines of said non-interlaced signal in dependence on said interlaced signal and said regeneration coefficients; and means for reconstructing said non-encoded lines of said non-interlaced signal in dependence on said interlaced signal and said regeneration coefficients, wherein said regeneration coefficients are mixing coefficients corresponding to non-discarded pixels enabling a reconstruction of said non-encoded lines by performing a weighted average of first and second signals generated from said interlaced signal, in dependence on said mixing coefficients.

9. An encoded non-interlaced signal having the shape of an interlaced signal, the encoded signal comprising:

an interlaced signal; and an auxiliary signal being formed by regeneration coefficients enabling a reconstruction of non-encoded lines of said non-interlaced signal in dependence on said interlaced signal and said regeneration coefficients, wherein said regeneration coefficients are mixing coefficients corresponding to non-discarded pixels enabling a reconstruction of said non-encoded lines by performing a weighted average of first and second signals generated from said interlaced signal in dependence on said mixing coefficients.

* * * * *